Figure 1:
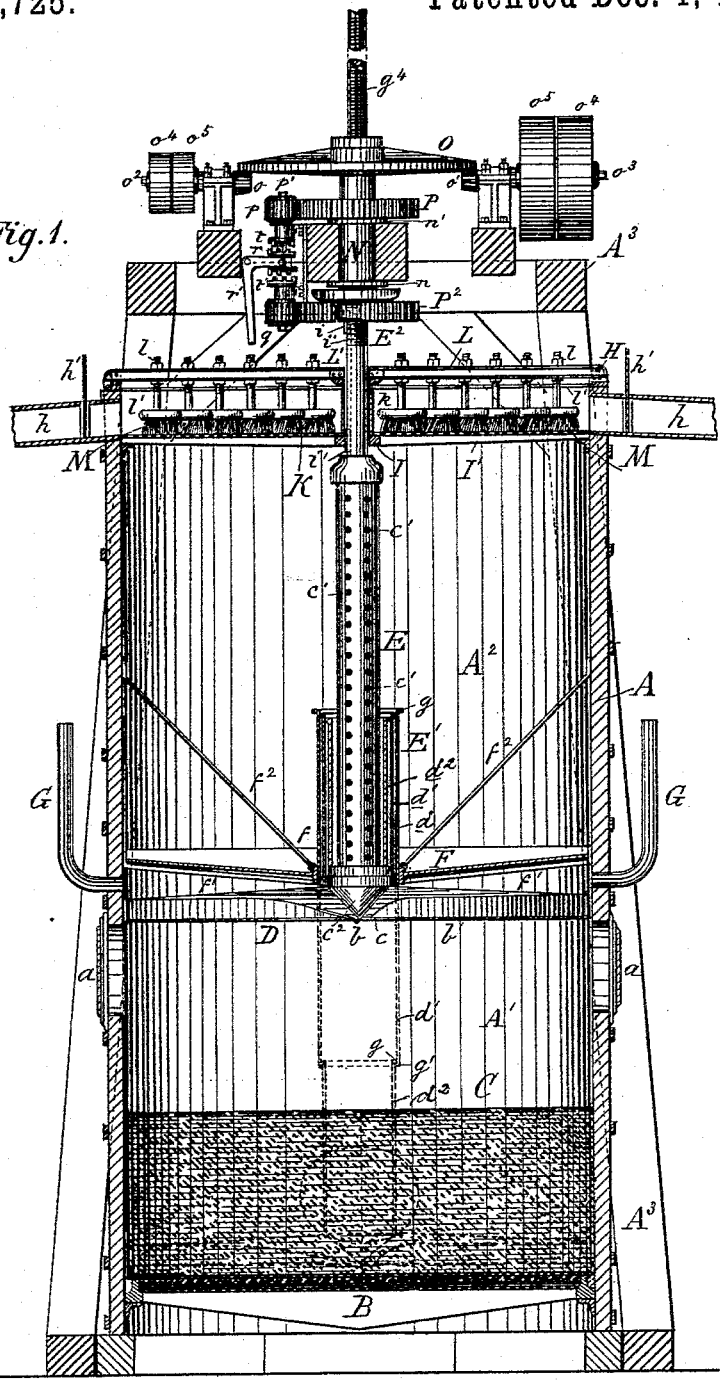

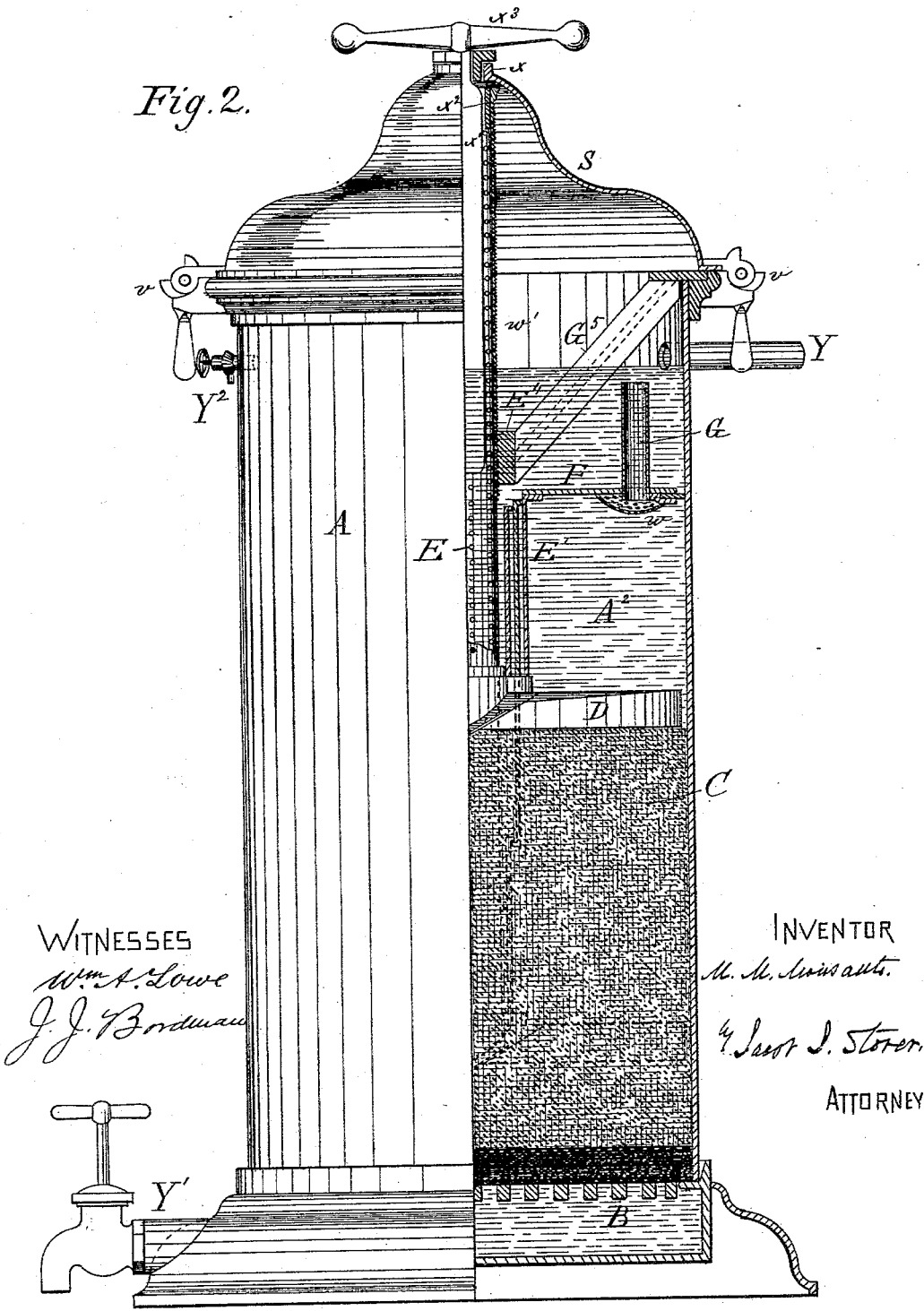

UNITED STATES PATENT OFFICE.

MAURICIO M. MONSANTO, OF NEW YORK, N. Y., ASSIGNOR TO W. A. OGDEN HEGEMAN, OF SAME PLACE.

APPARATUS FOR FILTERING LIQUIDS.

SPECIFICATION forming part of Letters Patent No. 331,725, dated December 1, 1885.

Application filed July 10, 1884. Serial No. 137,281. (No model.)

*To all whom it may concern:*

Be it known that I, MAURICIO M. MONSANTO, a citizen of the United States of Colombia, and a resident of the city, county, and State of New York, have invented a new and useful Improvement in Apparatus for Filtering Liquids, of which the following is a specification.

The object of this invention is to provide an improved apparatus for filtering liquids.

The invention relates to that class of filters in which provision is made for continuously or intermittently scraping or removing the surface of the filter-bed; and it consists of novel devices for arresting and removing suspended or floating foreign matter from the liquid before the latter comes in contact with the filter-bed; of a device for separating the liquid-supply chamber from the filtering-chamber, and in an improved spindle and telescopic prolongation thereof, and of other novel points in the construction of the apparatus, whereby it is made more effective, all of which will be hereinafter fully set forth.

Reference is to be had to the accompanying drawings, forming part of the specification, in which similar letters of reference indicate corresponding parts in all the figures.

Figure 1 is a partly-sectional elevation of my improved apparatus. Fig. 2 is an elevation of a modified form of the same, partly in section, designed for household use.

The shell A is designed to be cylindrical, and provided with man-holes $a$, for access to the interior of the shell for the purpose of introducing or removing the filtering medium. In the lower part of the shell, near the bottom thereof, which may be fully open, is a grating, B, strong enough to sustain the bed or mass of filtering material C against the pressure, and this grating is designed to be covered with a perforated plate, over which a sheet of cloth may be stretched. Within the cylinder A is a movable cutter-head, D, by means of which the liquid to be filtered is distributed and the foul matter which is separated from the liquid removed. The said cutter-head consists of a hollow disk having an opening in the top, fitting loosely in the cylinder A, and provided with a paring-blade $b$. The paring-blade is set at an angle, with its cutting-edge protruding slightly below the under surface of the bottom of the cutter-head, and is designed to be secured by bolts, so that it may be readily set up when worn away, or may be adjusted to remove a thicker or thinner paring from the surface of the filter-bed. The paring-blade is secured in an opening formed through the cutter-head for that purpose, and the bottom plate, $b'$, of the cutter-head is designed to be perforated with small holes, sufficient in the aggregate for the discharge of the liquid to be filtered.

By constructing the cutter-head hollow and with a perforated bottom the liquid to be filtered is distributed substantially uniformly over the filter-bed, and the plowing up of the latter by the forcible influx of a large volume of liquid at any one point is prevented. This cutter-head D is secured to the lower end of a tubular spindle, E, by means of a hub, $c$, by which it may be revolved, raised, and lowered, and the said spindle E, which extends axially upward to near the top of the shell A, is provided with numerous lateral perforations $c'$, through which the liquid to be filtered flows, to escape into and through the cutter-head upon the filter-bed C. The central part of the bottom of the cutter-head is constructed with a conical boss, $c^2$, which projects as low as the cutter-blade. In the supply-chamber $A^2$, above the cutter-head D, is a circular diaphragm or division-plate, F, of sheet-iron or other suitable material, extending to the walls of the shell and separating the supply-chamber $A^2$ from the filtering-chamber $A'$, so that the foul liquid from the latter shall not mix with the liquid in the former chamber. In the center of this division-plate F, and forming an integral part thereof, is an annular hub, $f$, surrounding the lower end of the spindle E, from which radiate arms $f'$, that extend beneath said plate and assist in supporting it, and braces $f^2$, extending from shell A to plate F, serve as further supports to said plate. About the lower end of spindle E is a telescoping device, $E'$, consisting of three concentric pipes or tubes, $d\ d'\ d^2$, respectively, each of which has a ring, as indicated at $g$, secured on the outside of its upper end, and a ring, $g'$, secured on the inside of its lower end. The lower end of the outer pipe, $d$, is fitted in the opening of the hub $f$, and the lower end of the inner pipe, $d^2$, is secured fast to the hub $c$ of the cutter-head, so that when the said cutter-head D is forced down the said pipes extend in correspondence with the downward movement, as indicated in dotted lines, Fig. 1, and are held together in place. The object of this telescoping device E′ is to prevent, as the cutter-head is moved down, the inflow into the spindle E of the sediment and cuttings or scrapings removed from the filter-bed by the action of the said head, keeping a constant separation between the inflowing liquid and the liquid that holds in suspension the matter removed from the filter-bed. Vent pipes G are fixed in the shell A to permit the escape of air when the device is in operation. The spindle E is prolonged upward by a shaft, $E^2$, whose upper portion is externally screw-threaded, as shown at $g^4$. Secured about the upper rim of the shell A is an iron trough, H, provided with one or more peripheral discharge-chutes, $h$, that have tight sliding gates $h'$, by which they may be opened or closed. A spider consisting of hub I, with radiating arms I′, is fitted loosely over the shaft $E^2$, and is adapted to revolve therewith by means of a key, $i$, fixed in the hub, and entering a corresponding keyway, $i'$, in said shaft, said arms I′ being extended, with their extremities reaching to the rim of the trough H. A perforated plate or wire-gauze-screen, K, is secured on the upper face of the spider I I′, and revolves with it, and is provided with a central cylindrical hub, $k$, that fits closely about the hub I, and extends upward about the spindle E, as indicated.

An iron strap, L, preferably constructed in two sections joined together, is fitted loosely, by means of its split hub L′, about the shaft $E^2$, and forms a guide for said shaft, the outer ends of said strap being secured on the edge of the trough H, as shown. This strap L is perforated, and brushes M are adjustably attached thereto at suitable angles to the central line of the strap by inserting the brush-handles through the strap and securing them by upper and lower nuts, $l\ l'$, respectively. These brushes M are designed to be kept always in contact with the perforated plate K as the latter is revolved beneath them.

In order that the cutter-head may be turned axially, and may also be raised and lowered, the shaft $E^2$ is combined with an internally-screw-threaded sleeve and gearing, which are supported on the frame $A^3$, within which the apparatus is inclosed. The sleeve N is fitted to the shaft $E^2$, and is fitted to revolve in a bearing in the frame $A^3$, its endwise motion therein being prevented in an upper direction by a collar, $n$, at the lower end of the sleeve, and being prevented in a downward direction by a collar, $n'$, fixed on said sleeve about midway of its length. On the upper end of the sleeve N is secured a crown bevel-wheel, O, which is driven by either of two pinions, $o\ o'$, whose shafts $o^2\ o^3$ are fitted with fast and loose belt-pulleys $o^4\ o^5$, so that when the driving-belt of one shaft and pinion, $o\ o^2$, for instance, is on the fast pulley thereof the driving-belt of the other shaft and pinion is on the loose pulley thereof. One driving-pinion may thus be used to drive the screw-sleeve N in one direction and the other pinion be used to reverse the movement of said sleeve.

The sleeve N, on which the beveled wheel O is fast, has below the said wheel a cog-wheel, P, secured to it, whose teeth engage with those of a pinion, $p$, that is mounted loosely upon a vertical shaft, $p'$. This pinion-shaft $p'$ has a second pinion, $q$, fixed on it, with its teeth engaged with those of a counter cog-wheel, $P^2$, which has one tooth less than the wheel P has, and whose hub is arranged to turn freely upon the shaft $E^2$. This hub of wheel $P^2$ is provided with a key or spline, which is fitted in the keyway $i'$ of the shaft $E^2$. The pinion-shaft $p'$ is fitted with a sliding clutch, $r$, which is manipulated with a forked lever, $r'$, and has clutch-teeth of the ordinary construction at its ends, the said clutch being connected with the pinion-shaft $p'$ by a spline and groove. The upper clutch-teeth are adapted to be engaged with corresponding clutch-teeth, $t$, on the lower end of the hub of the pinion $p$, and the lower clutch-teeth are adapted to be engaged with corresponding teeth, $t'$, on the upper end of the hub of the pinion $q$; hence, when the clutch is depressed, the engagement of the clutch-teeth with the teeth of the hub of the pinion $q$ holds said pinion and the wheel $P^2$ (which it controls) stationary, thereby preventing the shaft $E^2$ and the clutch-head from turning axially, and consequently the turning of the sleeve N in one direction by one of the driving-pinions $o'$ will then screw the cutter-head rapidly downward to the surface of the filter-bed C, while if the clutch $r$ be shifted so as to engage its upper teeth with the clutch-teeth $t$ of the pinion $p$, and the sleeve N be driven by the pinion $o$, the cutter-head, with its shaft $E^2$, will be caused to revolve, by the action of the pinion $q$ and the wheel $P^2$, slightly faster than the sleeve N is revolved in the direction to raise the cutter-head, and consequently the cutter-head, while being revolved in a direction to pare the filter-bed, will be screwed slowly downward. The speed at which the cutter-head is thus caused to descend depends upon the difference between the number of teeth of the wheels P $P^2$ of the differential gearing P $P^2$ $p$ $q$, which may be varied by increasing or decreasing the number of cog-teeth, as found expedient. If, on the other hand, the sleeve N be revolved by the pulley $o^4$ and pinion $o$, while the clutch is engaged with the upper end of the hub of the pinion $q$, the cutter-head will be raised rapidly without revolving in the filter-chamber.

When the apparatus is to be charged with the filtering material, the cutter-head is raised up and the material introduced beneath it through the higher man-holes. The man-holes are then closed and the cutter head lowered upon the filter-bed. The liquid to be filtered is introduced upon the perforated plate K, which revolves with the shaft $E^2$, and thence flows into the supply-chamber $A^2$. As the shaft $E^2$ and plate K revolve, the brushes M sweep the latter and expel all floating substances from the liquid out through the trough-chutes $h$, so that said substances shall not enter the supply-chamber to clog the perforations in the spindle E. The liquid in the supply-chamber $A^2$ enters the perforations of the spindle E, and thence through the cutter-head, by which it is distributed evenly through perforations, as set forth, upon the filter-bed.

The device being in operation so that the cutter-head revolves, the action of the differential gear causes the progressive depression of the cutter-head in the filtering-chamber, and causes the blade to pare off the surface of the filter-bed, which becomes saturated with foul matter. The foul matter and matter of the filter-bed thus pared off pass up through the opening in the cutter-head in which the blade is secured, and through the opening in the top of said cutter-head into the space between the cutter-head and the division-plate F, and by said division-plate is prevented from mingling with the supply-liquid in the chamber $A^2$. The operation proceeds until the cutter-head approaches the bottom of the filter-chamber so closely that the thickness of the filtering material left between the two is insufficient for filtration. Then the motion of the cutter-head is stopped by shifting the driving-belt (not shown) to the loose pulley, the clutch $r$ is shifted into engagement with the clutch-teeth of the hub of the pinion $q$, and the revolution of the sleeve N is recommenced, so as to screw up the cutter-head to a desired position, and then the man-holes are opened and the mass of foul matter and contaminated filtering material removed, after which the shell A is cleansed inside and recharged with fresh filtering material, or the lower man-holes can be opened when the cutter-head is at its lowest point and the foul matter and contaminated filtering material above the cutter-head be removed through the lower man-holes.

The apparatus shown in Fig. 1 is designed to be operated by steam-power, and is especially adapted for use where water is used in large quantities. In Fig. 2 is shown a modification of the apparatus, designed more especially for household use, and arranged so that the water may be cooled as well as filtered.

In this household apparatus the division-plate F is fixed considerably above the cutter-head D at its highest point of elevation, and has inserted in it a vent-pipe, G, provided with a strainer, $w$, on its lower end. The perforated spindle E, externally screw-threaded, as shown at $w'$, extends axially to the top of the cover of the device through a nut, $E^4$, which is held in place by braces $G^5$, that converge with a downward inclination from the top of the shell A.

The cover S, held in position so as to be readily removed by locking devices $v$, has a central aperture, $x$, down through which a flat turning-bar, $x'$, is passed through a corresponding rectangular socket, $x^2$, formed within the spindle E. On the head of this bar $x'$ is a cross-handle, $x^3$, so that the operator by turning said handle and turning-bar can screw the spindle E and cutter-head down from the position shown in Fig. 2, or up to said position, for it will be seen that the spindle will on the turning of said bar $x'$ travel up or down in the nut $E^4$, while the said bar $x'$ will have no vertical movement.

The cover S may be easily removed for introducing ice for cooling the liquid in the apparatus, and the braces $G^5$ may be numerous enough to serve to hold the ice above the division-plate.

The liquid is introduced into the apparatus through pipe Y and drawn off through pipe Y', and the cock $Y^2$ serves as a gage-cock to indicate the water-line.

I am aware that Messrs. Farquhar and Oldham have invented devices resembling mine in some particulars. Hence I do not broadly claim the special features of their filtering apparatus; but,

Having thus described my invention, I claim as new and desire to secure by Letters Patent—

1. In a filtering apparatus having a cutter-head arranged to be kept in contact with the filter-bed, and to continuously or intermittently remove the surface of the filter-bed, the combination, with such cutter-head, of a stationary division-plate or diaphragm adapted and arranged to separate the supply-chamber from the filtering-chamber, substantially as and for the purpose described.

2. In a filtering apparatus in which provision is made for removing the surface of the filter-bed during the filtering process by means of a cutting device adapted to be kept in constant contact with the filter-bed surface, the combination, with said cutting device, of a hollow laterally-perforated spindle carrying the same, and a telescoping spindle-extension, substantially as and for the purposes herein shown and described.

3. In a filtering apparatus, the combination, with the filter case or shell, of the revolving spider I I', the fixed trough H, having controlled outlets $h$ and perforated plate $k$, and the brushes M, adapted to arrest and remove suspended or floating foreign matter from the liquid before the latter comes in contact with the filter-bed, substantially as herein shown and described.

4. In a filtering apparatus, substantially as described, the combination, with the cutter-head, perforated tube, and a diaphragm, as F, of a series of telescopic tubes, the outer tube being fitted to the diaphragm and the inner one secured to the hub of the cutter-head, as set forth.

5. In a filtering apparatus, as described, the combination, with the shell A, having bent pipes G, man-holes $a$, and diaphragm, of the cutter-head D, the telescopic tubes, and means for operating the cutter-head, as set forth.

In testimony that I claim the foregoing as my invention I have signed my name, in presence of two witnesses, this 11th day of June, 1884.

MAURICIO M. MONSANTO.

Witnesses:
 JACOB J. STORER,
 JOHN J. BORDMAN.